(12) United States Patent
Kubo et al.

(10) Patent No.: US 10,048,167 B2
(45) Date of Patent: Aug. 14, 2018

(54) ENGINE TORQUE ESTIMATOR FOR INTERNAL COMBUSTION ENGINE AND METHOD OF ESTIMATING ENGINE TORQUE FOR INTERNAL COMBUSTION ENGINE

(71) Applicant: HONDA MOTOR CO., LTD., Tokyo (JP)

(72) Inventors: Tomoya Kubo, Wako (JP); Taisuke Inoue, Wako (JP); Shusuke Akazaki, Wako (JP); Ken Ogawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 70 days.

(21) Appl. No.: 15/267,147

(22) Filed: Sep. 16, 2016

(65) Prior Publication Data
US 2017/0082523 A1    Mar. 23, 2017

(30) Foreign Application Priority Data
Sep. 17, 2015    (JP) ................................ 2015-183922

(51) Int. Cl.
*G01M 15/04*    (2006.01)
*F02D 35/02*    (2006.01)
(Continued)

(52) U.S. Cl.
CPC ........... *G01M 15/044* (2013.01); *F02B 75/02* (2013.01); *F02B 77/085* (2013.01);
(Continued)

(58) Field of Classification Search
CPC ... G01M 15/044; G01M 15/08; F02D 35/023; F02D 41/009; F02D 2041/389;
(Continued)

(56) References Cited

U.S. PATENT DOCUMENTS

| | | | | |
|---|---|---|---|---|
| 2006/0229158 A1* | 10/2006 | Ichihara | ................ | F02D 11/105 477/185 |
| 2007/0261482 A1* | 11/2007 | Mizuno | ................. | F02D 35/023 73/114.16 |
| 2011/0303190 A1* | 12/2011 | Yasuda | ................. | F02D 35/023 123/435 |

FOREIGN PATENT DOCUMENTS

| | | | | |
|---|---|---|---|---|
| EP | 2400133 A2 * | 12/2011 | ........... | F02D 41/123 |
| JP | 11-050889 | 2/1999 | | |

(Continued)

OTHER PUBLICATIONS

Japanese Office Action for corresponding JP Application No. 2015-183922, Jun. 27, 2017 (w/ English machine translation).

*Primary Examiner* — Daniel S Larkin
*Assistant Examiner* — Anthony W Megna Fuentes
(74) *Attorney, Agent, or Firm* — Mori & Ward, LLP

(57) ABSTRACT

An engine torque estimator for an internal combustion engine, includes a cylinder internal pressure sensor, an indicated-torque calculator, a pump loss torque calculator, and an engine torque calculator. The cylinder internal pressure sensor detects a cylinder internal pressure in a cylinder. The indicated-torque calculator calculates an indicated torque in a second combustion cycle based on the cylinder internal pressure detected in a period from an exhaust stroke in a first combustion cycle to an expansion stroke in the second combustion cycle. The second combustion cycle that follows the first combustion cycle. The pump loss torque calculator calculates a pump loss torque in the second combustion cycle based on the cylinder internal pressure detected in the period. The engine torque calculator calculates an engine torque of the internal combustion based on the indicated torque and the pump loss torque.

7 Claims, 4 Drawing Sheets

(51) Int. Cl.
*F02D 41/00* (2006.01)
*G01M 15/08* (2006.01)
*F02B 75/02* (2006.01)
*F02B 77/08* (2006.01)
*F02D 41/38* (2006.01)

(52) U.S. Cl.
CPC ......... *F02D 35/023* (2013.01); *F02D 41/009* (2013.01); *G01M 15/08* (2013.01); *F02D 2041/389* (2013.01); *F02D 2200/1004* (2013.01); *F02D 2200/1006* (2013.01); *F02D 2400/02* (2013.01)

(58) Field of Classification Search
CPC ..... F02D 2200/1006; F02D 2200/1004; F02D 2400/02; F02B 75/02; F02B 77/085
USPC .......................................... 73/114.15–114.16
See application file for complete search history.

(56) References Cited

FOREIGN PATENT DOCUMENTS

| | | |
|---|---|---|
| JP | 2000-064900 | 2/2000 |
| JP | 2000-120486 | 4/2000 |
| JP | 2004-150424 | 5/2004 |
| JP | 2005-201236 | 7/2005 |
| JP | 2006-291803 | 10/2006 |
| JP | 2015-140724 | 8/2015 |

\* cited by examiner

ENGINE TORQUE ESTIMATOR FOR INTERNAL COMBUSTION ENGINE AND METHOD OF ESTIMATING ENGINE TORQUE FOR INTERNAL COMBUSTION ENGINE

CROSS-REFERENCE TO RELATED APPLICATIONS

The present application claims priority under 35 U.S.C. § 119 to Japanese Patent Application No. 2015-183922, filed Sep. 17, 2015, entitled "Engine Torque Estimator for Internal Combustion Engine." The contents of this application are incorporated herein by reference in their entirety.

BACKGROUND

1. Field

The present disclosure relates an engine torque estimator for an internal combustion engine and a method of estimating an engine torque for the internal combustion engine.

2. Description of the Related Art

One known example of an engine torque estimator for an internal combustion engine is disclosed in Japanese Unexamined Patent Application Publication No. 11-50889. The engine torque estimator calculates a target shaft torque, friction loss torque, indicated torque, and pump loss torque on the basis of running states of the engine (e.g., the amount of operation of an accelerator, rotational speed, water temperature, amount of air) and then estimates an engine torque by computation using them. Specifically, the indicated torque is calculated by adding the friction loss torque and target shaft torque, and the pump loss torque is calculated by searching a predetermined map on the basis of an intake pressure. The engine torque is calculated on the basis of the calculated indicated torque and pump loss torque.

Typically, a combustion state in the engine varies every moment. Thus, it is presumed that the temperature inside a cylinder and the cylinder internal pressure vary and, with that variation, the indicated torque and pump loss torque also vary. Accordingly, during transient driving in which variations in the combustion state are significantly large, it is difficult to properly assess the pump loss torque, and it is therefore difficult to properly estimate the engine torque during the transient driving.

One example of a device for calculating a pump loss torque in controlling the torque of the engine is disclosed in Japanese Unexamined Patent Application Publication No. 2006-291803. The device disclosed in that patent document calculates the pump loss torque by searching a predetermined map on the basis of an intake pressure difference (=atmospheric pressure−intake manifold pressure) and an engine rotational speed. In a combustion stop period for which fuel is cut off, the degree of accuracy in calculation of the pump loss torque is enhanced by correcting the pump loss torque in accordance with the atmospheric pressure, estimated indicated torque, intake manifold pressure, engine rotational speed, and engine water temperature.

SUMMARY

According to a first aspect of the present invention, an engine torque estimator for an internal combustion engine that sequentially executes an intake stroke, compression stroke, expansion stroke, and exhaust stroke in a single combustion cycle in a cylinder, the engine torque estimator includes a cylinder internal pressure sensor, an indicated-torque calculating unit, a pump loss torque calculating unit, and an engine torque calculating unit. The cylinder internal pressure sensor is configured to detect a pressure in the cylinder as a cylinder internal pressure. The indicated-torque calculating unit is configured to calculate an indicated torque on the basis of the detected cylinder internal pressure. The pump loss torque calculating unit is configured to calculate a pump loss torque on the basis of the detected cylinder internal pressure. The engine torque calculating unit is configured to calculate an engine torque of the internal combustion engine by using the calculated indicated torque and pump loss torque. The indicated-torque calculating unit and the pump loss torque calculating unit calculate the indicated torque and the pump loss torque relating to a current combustion cycle, respectively, on the basis of the cylinder internal pressure detected in a period from the exhaust stroke in a previous combustion cycle to the expansion stroke in the current combustion cycle.

According to a second aspect of the present invention, an engine torque estimator for an internal combustion engine, includes a cylinder internal pressure sensor, an indicated-torque calculator, a pump loss torque calculator, and an engine torque calculator. The cylinder internal pressure sensor detects a cylinder internal pressure in a cylinder in which an intake stroke, a compression stroke, an expansion stroke, and an exhaust stroke are sequentially executed in a single combustion cycle in combustion cycles of the internal combustion engine. The combustion cycles include a first combustion cycle and a second combustion cycle that follows the first combustion cycle. The indicated-torque calculator calculates an indicated torque in the second combustion cycle based on the cylinder internal pressure detected by the cylinder internal pressure sensor in a period from the exhaust stroke in the first combustion cycle to the expansion stroke in the second combustion cycle. The pump loss torque calculator calculates a pump loss torque in the second combustion cycle based on the cylinder internal pressure detected by the cylinder internal pressure sensor in the period. The engine torque calculator calculates an engine torque of the internal combustion based on the indicated torque and the pump loss torque.

According to a third aspect of the present invention, a method of estimating an engine torque for an internal combustion engine, includes detecting a cylinder internal pressure in a cylinder in which an intake stroke, a compression stroke, an expansion stroke, and an exhaust stroke are sequentially executed in a single combustion cycle in combustion cycles of the internal combustion engine. The combustion cycles include a first combustion cycle and a second combustion cycle that follows the first combustion cycle. An indicated torque in the second combustion cycle is calculated based on the cylinder internal pressure detected in a period from the exhaust stroke in the first combustion cycle to the expansion stroke in the second combustion cycle. A pump loss torque in the second combustion cycle is calculated based on the cylinder internal pressure detected in the period. An engine torque of the internal combustion is calculated based on the indicated torque and the pump loss torque.

According to a fourth aspect of the present invention, an engine torque estimator for an internal combustion engine, includes a cylinder internal pressure sensor and circuitry. The cylinder internal pressure sensor detects a cylinder internal pressure in a cylinder in which an intake stroke, a compression stroke, an expansion stroke, and an exhaust stroke are sequentially executed in a single combustion cycle in combustion cycles of the internal combustion engine. The combustion cycles include a first combustion cycle and a second combustion cycle that follows the first combustion cycle. The circuitry is configured to calculate an indicated torque in the second combustion cycle based on the cylinder internal pressure detected by the cylinder internal pressure sensor in a period from the exhaust stroke in the first combustion cycle to the expansion stroke in the second combustion cycle. The circuitry is configured to calculate a pump loss torque in the second combustion cycle based on the cylinder internal pressure detected by the cylinder internal pressure sensor in the period. The circuitry is configured to calculate an engine torque of the internal combustion based on the indicated torque and the pump loss torque.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
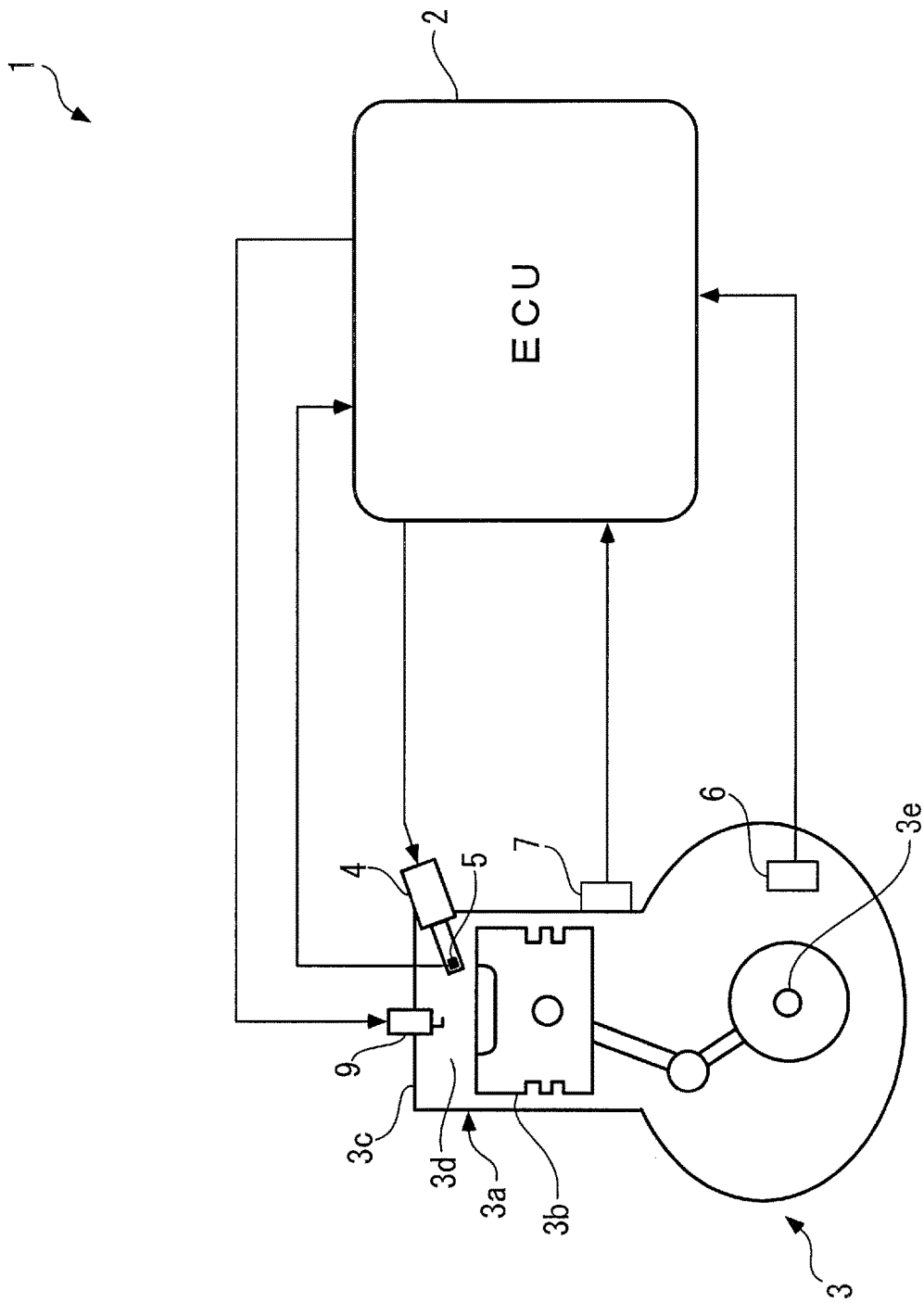
FIG. 1 illustrates a general configuration of an engine torque estimator and an internal combustion engine that uses it according to an embodiment of the present disclosure.

The embodiments will now be described with reference to the accompanying drawings, wherein like reference numerals designate corresponding or identical elements throughout the various drawings.

A preferred embodiment of the present disclosure is described below with reference to the drawings. FIG. 1 illustrates a schematic configuration of an engine torque estimator 1 and an internal combustion engine (hereinafter referred to as "engine") 3 using it according to an embodiment of the present disclosure. One example of the engine 3 may be a gasoline engine including four cylinders 3a (only one being illustrated) and be mounted on a vehicle (not illustrated). In each of the cylinders 3a, a combustion chamber 3d is formed between a piston 3b and a cylinder head 3c.

A fuel injection valve (hereinafter referred to as "injector") 4 and an ignition plug 9 are attached to each of the cylinder heads 3c such that they face the combustion chamber 3d. Fuel injected from the injector 4 is mixed with air sucked into the combustion chamber 3d, the resulting gas mixture is ignited by the ignition plug 9, and it is burned inside the combustion chamber 3d.

A cylinder internal pressure sensor 5 is integrally mounted on each of the injectors 4. The cylinder internal pressure sensor 5 includes a piezoelectric element, is mounted on an end portion of the injector 4, and is configured to detect a cylinder internal pressure change DP, which is the amount of change in the pressure inside the cylinder 3a in the engine 3, and to output a detection signal indicating it to an ECU 2. The ECU 2 calculates a cylinder internal pressure PCYL on the basis of the cylinder internal pressure change DP.

A crank angle sensor 6 is mounted on a crank shaft 3e in the engine 3. The crank angle sensor 6 is configured to output a CRK signal and TDC signal, which are both pulse signals, to the ECU 2 in accordance with rotation of the crank shaft 3e.

The CRK signal is output for each predetermined crank angle (e.g., one degree). The ECU 2 calculates an engine revolution number NE, which is the number of revolutions of the engine 3, on the basis of the CRK signal. The TDC signal is a signal indicating that the piston 3b in the cylinder 3a is in a predetermined crank angle position slightly before a TDC position in an intake stroke and is output for each 180 degrees of crank angle in the present example, which uses four cylinders.

The ECU 2 is connected to a water temperature sensor 7 on the engine 3. The water temperature sensor 7 is configured to detect an engine water temperature TW and output it to the ECU 2.

The ECU 2 includes a microcomputer including an input/output (I/O) interface, central processing unit (CPU), random-access memory (RAM), and read-only memory (ROM) (all of which are not illustrated). Detection signals from each of the above-described sensors 5 to 7 are subjected to analog-to-digital conversion or shaping at the I/O interface, and then they are input into the CPU.

The CPU calculates an indicated torque IDTQ and pump loss torque PLTQ under a control program or the like stored in the ROM in response to the above input signals and calculates an engine torque ENTQ of the engine 3 by using them. In the present embodiment, the ECU 2 corresponds to an indicated-torque calculating unit, pump loss torque calculating unit, and engine torque calculating unit.

Figure 2:
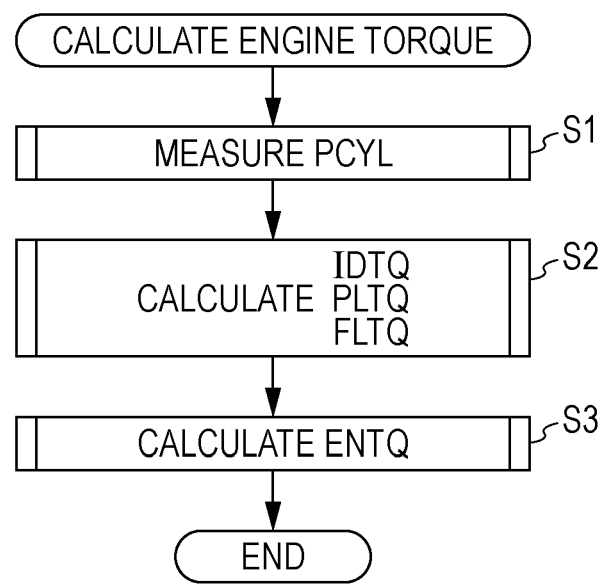
FIG. 2 is a flow chart that illustrates a process for calculating an engine torque.
Figure 3:
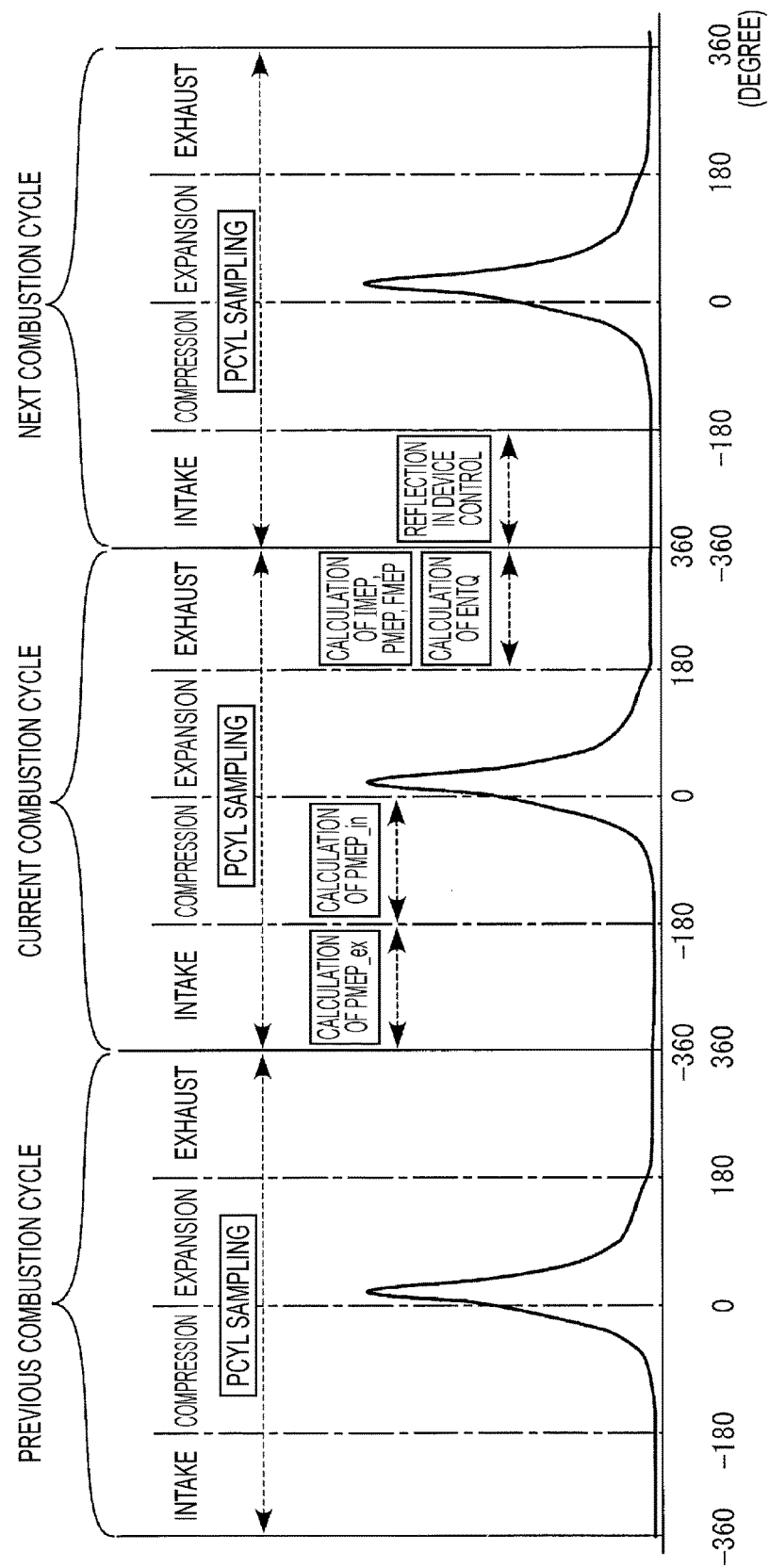
FIG. 3 illustrates changes of a cylinder internal pressure in a combustion cycle with respect to a crank angle.

FIG. 2 is a flow chart that illustrates a process for calculating the engine torque. In that process, first, at step 1 (indicated as "S1"; the same applies to hereinafter), the cylinder internal pressure PCYL of the corresponding cylinder 3a is measured by the cylinder internal pressure sensor 5 on each of the cylinder 3a. Specifically, as illustrated in FIG. 3, for each combustion cycle, in a period from the time when an intake stroke starts to the time when an exhaust stroke ends (crank angle: −360 degrees to 360 degrees), the cylinder internal pressure PCYL is sampled and stored in the RAM for, for example, each one degree of crank angle.

Then, the indicated torque IDTQ, pump loss torque PLTQ, and friction loss torque FLTQ are calculated on the basis of the sampled cylinder internal pressure PCYL by the following expressions (1), (2), and (3), respectively (step 2).

$$IDTQ = \frac{IMEP \cdot Vd \cdot Ncyl}{4\pi} \quad (1)$$

$$PLTQ = \frac{PMEP \cdot Vd \cdot Ncyl}{4\pi} \quad (2)$$

$$FLTQ = \frac{FMEP \cdot Vd \cdot Ncyl}{4\pi} \quad (3)$$

In the expression (1), IMEP indicates an indicated mean effective pressure. In the expression (2), PMEP indicates a pump loss. In the expression (3), FMEP indicates a friction loss. In the expressions (1) to (3), Vd indicates a piston displacement and Ncyl indicates the number of cylinders.

The indicated mean effective pressure IMEP in the expression (1) is calculated by the following expression (4).

$$IMEP = \frac{1}{Vd} \int_{V_{-180}}^{V_{180}} PCYL \cdot dV \quad (4)$$

where $V\theta$ indicates the volume of the combustion chamber at crank angle $\theta$.

Figure 4:
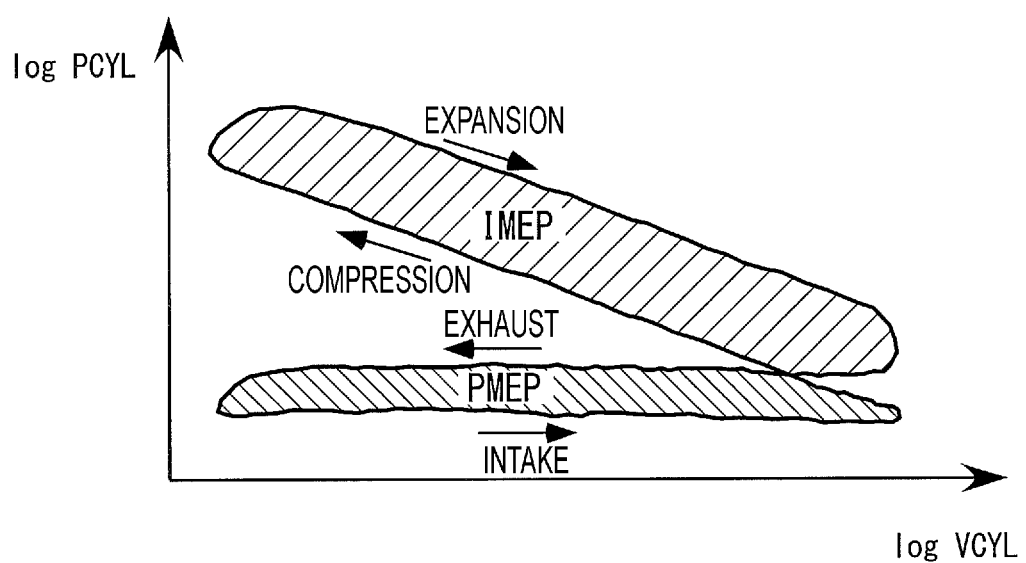
FIG. 4 illustrates an example indicator diagram in a single combustion cycle.

In the expression (4), dV indicates the amount of change in the volume V of the cylinder 3a. As is clear from the interval of integration in the expression (4) and FIGS. 3 and 4, the indicated mean effective pressure IMEP is calculated by using the cylinder internal pressure PCYL sampled in the compression stroke and expansion stroke in the current combustion cycle. That is, the indicated mean effective pressure IMEP is calculated by using, as the interval of integration, the interval between the time when the compression stroke in the current combustion cycle starts (crank angle: −180 degrees) to the time when the expansion stroke ends (crank angle: 180 degrees) and immediately after that expansion stroke, that is, during the exhaust stroke in the current combustion cycle. The above crank angle is the value when the crank angle at the top dead center between the compression stroke and expansion stroke in the combustion cycle is zero degrees.

The pump loss PMEP in the above expression (2) is calculated by using the pump loss PMEP_ex relating to the exhaust stroke in the previous combustion cycle and the pump loss PMEP_in relating to the intake stroke in the current combustion cycle by the following expression (5).

$$PMEP = \text{PMEP\_ex} + \text{PMEP\_in} \quad (5)$$

$$= \frac{1}{Vd}\int_{V_{180}}^{V_{360}} PCYL \cdot dV + \frac{1}{Vd}\int_{V_{-360}}^{V_{-180}} PCYL \cdot dV$$

The above pump loss PMEP_ex relating to the above exhaust stroke is calculated by using, as the interval of integration, the interval between the time when the exhaust stroke in the previous combustion cycle starts (crank angle: 180 degrees) to the time when it ends (crank angle: 360 degrees) and immediately after that exhaust stroke in the previous combustion cycle, that is, during the intake stroke in the current combustion cycle. The pump loss PMEP_in relating to the intake stroke is calculated by using, as the interval of integration, the interval between the time when the intake stroke in the current combustion cycle starts (crank angle: −360 degrees) to the time when it ends (crank angle: −180 degrees) and immediately after that intake stroke, that is, during the compression stroke in the current combustion cycle.

Accordingly, the pump loss PMEP is calculated during the exhaust stroke in the current combustion cycle by adding the pump loss PMEP_ex relating to the exhaust stroke and pump loss PMEP_in relating to the intake stroke calculated as described above. In that case, the amount of area used in the RAM can be reduced by freeing up the storage area in the RAM storing the cylinder internal pressure PCYL in the previous combustion cycle immediately after the pump loss PMEP_ex relating to the above exhaust stroke is calculated.

The friction loss FMEP in the above expression (3) is calculated during, for example, the exhaust stroke in the current combustion cycle by searching a map (not illustrated) in accordance with the engine revolution number NE of the engine 3, engine water temperature TW, and the like.

The engine torque ENTQ is calculated by using the indicated torque IDTQ, pump loss torque PLTQ, and friction loss torque FLTQ calculated by the above expressions (1) to (5) by the following expression (6) (step 3), and the process is completed.

$$ENTQ = IDTQ + PLTQ + FLTQ \quad (6)$$

The expression (6) for calculating the engine torque ENTQ can be expressed as the following expression (7) by using the indicated mean effective pressure IMEP, pump loss PMEP, and friction loss FMEP by substituting the expressions (1) to (3) into the right side of the expression (6).

$$ENTQ = (IMEP + PMEP + FMEP) \cdot \frac{Vd \cdot Ncyl}{4\pi} \quad (7)$$

As described above, the computation for the engine torque ENTQ relating to the current combustion cycle starts immediately after the end of its exhaust stroke, and it is calculated during the exhaust stroke. Then, the calculated engine torque ENTQ can be reflected in controlling various devices from the time when the next combustion cycle starts, that is, from the time when the intake stroke in the next combustion cycle starts.

As described in detail above, according to the present embodiment, because the indicated torque IDTQ and pump loss torque PLTQ for use in calculating the engine torque ENTQ are calculated on the basis of the cylinder internal pressure PCYL detected by the cylinder internal pressure sensor 5, they can be accurately detected, and thus the engine torque ENTQ can also be accurately detected.

The pump loss torque PLTQ in the current combustion cycle is calculated by using the cylinder internal pressure PCYL in the exhaust stroke in the previous combustion cycle, instead of the cylinder internal pressure PCYL in the exhaust stroke in the current combustion cycle, and the cylinder internal pressure PCYL in the intake stroke in the current combustion cycle. Therefore, the timing of calculating the engine torque ENTQ can be advanced by starting the computation earlier by a single stroke of an exhaust stroke, in comparison with the case where, after completion of a single combustion cycle from an intake stroke to an exhaust stroke, the indicated torque, pump loss torque, and engine torque are calculated on the basis of the cylinder internal pressure PCYL sampled in that combustion cycle. Therefore, the calculated engine torque ENTQ can be promptly reflected in controlling various devices, and the control response of the engine 3 can be enhanced.

The present disclosure is not limited to the above-described embodiment and can be made in various forms. For example, in the above embodiment, the cylinder internal pressure sensor 5 is disposed for each of the cylinders 3a. The present disclosure is not limited to that configuration. The cylinder internal pressure sensor 5 may be disposed for a predetermined one of the four cylinders 3a, and the cylinder internal pressures of the other three cylinder 3a may be estimated on the basis of the detection.

In the present embodiment, the pump loss torque PLTQ is calculated on the basis of the cylinder internal pressure PCYL sampled in the exhaust stroke in the previous combustion cycle and the intake stroke in the current combustion cycle. The present disclosure is not limited to that configuration. Pump loss torques described below may also be used.

That is, instead of the pump loss torque PLTQ calculated on the basis of the above-described sampled cylinder internal pressure PCYL, a pump loss torque calculated before the current combustion cycle may also be used. In that case, the calculation of the pump loss torque relating to the current combustion cycle can be omitted, and this leads to a reduction in the computation load by the ECU 2. As the pump loss torque PLTQ, a moving average value of pump loss torques in a plurality of combustion cycles may also be used.

In the present embodiment, the engine torque estimator 1 in the present disclosure is used in the engine 3, which is a gasoline engine. The present disclosure is not limited to that use. It may also be used in a diesel engine, of course, and various industrial internal combustion engines, including a marine propulsion engine, such as an onboard engine, in which a crank shaft is positioned vertically. The configuration details can be changed as appropriate within the scope of the present disclosure.

According to a first aspect of the embodiment, the engine torque estimator 1 for the internal combustion engine 3 that sequentially executes an intake stroke, compression stroke, expansion stroke, and exhaust stroke in a single combustion cycle in the cylinder 3a is provided. The engine torque estimator 1 includes the cylinder internal pressure sensor 5 configured to detect a pressure in the cylinder 3a as a cylinder internal pressure PCYL, an indicated-torque calculating unit (ECU 2 in the embodiment (the same applies to this paragraph) configured to calculate an indicated torque IDTQ on the basis of the detected cylinder internal pressure PCYL, a pump loss torque calculating unit (ECU 2) configured to calculate a pump loss torque PLTQ on the basis of the detected cylinder internal pressure PCYL, and an engine torque calculating unit (ECU 2) configured to calculate an engine torque ENTQ of the internal combustion engine 3 by using the calculated indicated torque IDTQ and pump loss torque PLTQ. The indicated-torque calculating unit and the pump loss torque calculating unit calculate the indicated torque IDTQ and the pump loss torque PLTQ relating to a current combustion cycle, respectively, on the basis of the cylinder internal pressure PCYL detected in a period from the exhaust stroke in a previous combustion cycle to the expansion stroke in the current combustion cycle.

With that configuration, the indicated torque and pump loss torque are calculated by the indicated-torque calculating unit and pump loss torque calculating unit, respectively, on the basis of the cylinder internal pressure detected by the cylinder internal pressure sensor. The indicated torque is a torque obtained by work that a working gas acts on a piston per combustion cycle (indicated work), and specifically, it is calculated on the basis of an indicated mean effective pressure corresponding to an area surrounded by a loop formed by a compression stroke and expansion stroke in an indicator diagram. The pump loss torque is a torque corresponding to loss work required for gas exchange in the intake stroke and exhaust stroke and is calculated on the basis of a pump loss corresponding to an area surrounded by a loop formed by the intake stroke and exhaust stroke in the indicator diagram. The indicated torque is calculated by multiplying the indicated mean effective pressure by a predetermined conversion factor, whereas the pump loss torque is calculated by multiplying the pump loss by a predetermined conversion factor. The engine torque of the internal combustion engine is calculated by the engine torque calculating unit using the calculated indicated torque and pump loss torque. In that way, because the indicated torque and pump loss torque relating to use in calculating the engine torque are calculated on the basis of the detected cylinder internal pressure, they can be accurately calculated, and thus the engine torque can also be accurately calculated.

The indicated torque and pump loss torque relating to the current combustion cycle are calculated by the indicated-torque calculating unit and pump loss torque calculating unit on the basis of the cylinder internal pressure detected in the period from the exhaust stroke in the previous combustion cycle to the expansion stroke in the current combustion cycle. Typically, in a combustion cycle, variations in the cylinder internal pressure in the compression stroke and expansion stroke among the combustion cycles are large because of combustion variations, knocking, or other reasons. Thus, the indicated torque relating to a combustion cycle can be accurately calculated in proper consideration of combustion variations in the combustion cycle by detecting the cylinder internal pressure in a period including the compression stroke and expansion stroke in that combustion cycle. In contrast, unlike the compression stroke and expansion stroke, the intake stroke and exhaust stroke in the combustion cycle are affected by only entrance and exit of intake and exhaust air with respect to the cylinder, and variations in the cylinder internal pressure are significantly smaller than those in the compression stroke and expansion stroke. Thus, the variations in the cylinder internal pressure in the exhaust stroke in the current combustion cycle can be considered to be substantially the same as the variations in the cylinder internal pressure in the exhaust stroke in the previous combustion cycle. Accordingly, in calculating the pump loss torque in the current combustion cycle, the cylinder internal pressure in the exhaust stroke in the previous combustion cycle can be used instead of the cylinder internal pressure in the exhaust stroke in the current combustion cycle, and the pump loss torque in the current combustion cycle can be calculated by using that cylinder internal pressure and the cylinder internal pressure in the intake stroke in the current combustion cycle.

As described above, the indicated torque and pump loss torque can be calculated on the basis of the cylinder internal pressure detected in the period from the exhaust stroke in the previous combustion cycle to the expansion stroke in the current combustion cycle, and the engine torque can be calculated by using them. Thus, the timing of calculating the engine torque can be advanced by starting the computation earlier by one stroke, in comparison with the case where the indicated torque, pump loss torque, and engine torque are calculated on the basis of the cylinder internal pressure detected in one combustion cycle after the completion of that combustion cycle, that is, after the completion of the exhaust stroke in the combustion cycle. Therefore, the calculated engine torque can be promptly reflected in controlling various devices, and the control response of the internal combustion engine can be enhanced.

According to a second aspect of the embodiment, in the engine torque estimator for the internal combustion engine in the first aspect of the embodiment, the engine torque calculating unit uses the pump loss torque calculated before the current combustion cycle in the calculation of the engine torque relating to the current combustion cycle, without using the pump loss torque relating to the current combustion cycle.

As described above, variations in the cylinder internal pressure are significantly small in the intake stroke and exhaust stroke in a combustion cycle. Thus, the use of the pump loss torque calculated before the current combustion cycle in the calculation of the engine torque can lead to an omission of the calculation of the pump loss torque relating to the current combustion cycle, and the computation load can be reduced correspondingly. In other cases, for example, as the pump loss torque, a moving average value of pump loss torques in a plurality of combustion cycles can also be used.

Obviously, numerous modifications and variations of the present invention are possible in light of the above teachings. It is therefore to be understood that within the scope of the appended claims, the invention may be practiced otherwise than as specifically described herein.

What is claimed is:

1. An engine torque estimator for an internal combustion engine that sequentially executes an intake stroke, compression stroke, expansion stroke, and exhaust stroke in a single combustion cycle in a cylinder, the engine torque estimator comprising:
a cylinder internal pressure sensor configured to detect a pressure in the cylinder as a cylinder internal pressure;
an indicated-torque calculating unit configured to calculate an indicated torque on the basis of the detected cylinder internal pressure;
a pump loss torque calculating unit configured to calculate a pump loss torque on the basis of the detected cylinder internal pressure; and
an engine torque calculating unit configured to calculate an engine torque of the internal combustion engine by using the calculated indicated torque and pump loss torque,
wherein the indicated-torque calculating unit and the pump loss torque calculating unit calculate the indicated torque and the pump loss torque relating to a current combustion cycle, respectively, on the basis of the cylinder internal pressure detected in a period from the exhaust stroke in a previous combustion cycle to the expansion stroke in the current combustion cycle, and
wherein the calculated engine torque is reflected in a control of the internal combustion engine.

2. The engine torque estimator for the internal combustion engine according to claim 1, wherein the engine torque calculating unit uses the pump loss torque calculated before the current combustion cycle in the calculation of the engine torque relating to the current combustion cycle, without using the pump loss torque relating to the current combustion cycle.

3. An engine torque estimator for an internal combustion engine, comprising:
a cylinder internal pressure sensor to detect a cylinder internal pressure in a cylinder in which an intake stroke, a compression stroke, an expansion stroke, and an exhaust stroke are sequentially executed in a single combustion cycle in combustion cycles of the internal combustion engine, the combustion cycles including a first combustion cycle and a second combustion cycle that follows the first combustion cycle;
an indicated-torque calculator to calculate an indicated torque in the second combustion cycle based on the cylinder internal pressure detected by the cylinder internal pressure sensor in a period from the exhaust stroke in the first combustion cycle to the expansion stroke in the second combustion cycle;
a pump loss torque calculator to calculate a pump loss torque in the second combustion cycle based on the cylinder internal pressure detected by the cylinder internal pressure sensor in the period; and
an engine torque calculator to calculate an engine torque of the internal combustion based on the indicated torque and the pump loss torque,
wherein the calculated engine torque is reflected in a control of the internal combustion engine.

4. The engine torque estimator according to claim 3, wherein the engine torque calculator uses the pump loss torque calculated before the second combustion cycle in the calculation of the engine torque relating to the second combustion cycle, without using the pump loss torque relating to the second combustion cycle.

5. A method of estimating an engine torque for an internal combustion engine, comprising:
detecting a cylinder internal pressure in a cylinder in which an intake stroke, a compression stroke, an expansion stroke, and an exhaust stroke are sequentially executed in a single combustion cycle in combustion cycles of the internal combustion engine, the combustion cycles including a first combustion cycle and a second combustion cycle that follows the first combustion cycle;
calculating an indicated torque in the second combustion cycle based on the cylinder internal pressure detected in a period from the exhaust stroke in the first combustion cycle to the expansion stroke in the second combustion cycle;
calculating a pump loss torque in the second combustion cycle based on the cylinder internal pressure detected in the period; and
calculating an engine torque of the internal combustion based on the indicated torque and the pump loss torque,
wherein the calculated engine torque is reflected in a control of the internal combustion engine.

6. The method according to claim 5, further comprising:
calculating the engine torque relating to the second combustion cycle based on the pump loss torque calculated before the second combustion cycle, without using the pump loss torque relating to the second combustion cycle.

7. An engine torque estimator for an internal combustion engine, comprising:
a cylinder internal pressure sensor to detect a cylinder internal pressure in a cylinder in which an intake stroke, a compression stroke, an expansion stroke, and an exhaust stroke are sequentially executed in a single combustion cycle in combustion cycles of the internal combustion engine, the combustion cycles including a first combustion cycle and a second combustion cycle that follows the first combustion cycle; and
circuitry configured to
calculate an indicated torque in the second combustion cycle based on the cylinder internal pressure detected by the cylinder internal pressure sensor in a period from the exhaust stroke in the first combustion cycle to the expansion stroke in the second combustion cycle,
calculate a pump loss torque in the second combustion cycle based on the cylinder internal pressure detected by the cylinder internal pressure sensor in the period, and
calculate an engine torque of the internal combustion based on the indicated torque and the pump loss torque, and
wherein the calculated engine torque is reflected in a control of the internal combustion engine.

* * * * *